(12) United States Patent
Senda et al.

(10) Patent No.: US 9,644,736 B2
(45) Date of Patent: May 9, 2017

(54) POWER TRANSMITTING DEVICE

(71) Applicant: Kawasaki Jukogyo Kabushiki Kaisha, Hyogo (JP)

(72) Inventors: Atsushi Senda, Kakogawa (JP); Yoshinobu Tanaka, Hyogo (JP); Yoshiharu Matsuda, Akashi (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 127 days.

(21) Appl. No.: 14/535,206

(22) Filed: Nov. 6, 2014

(65) Prior Publication Data

US 2015/0128745 A1 May 14, 2015

(30) Foreign Application Priority Data

Nov. 13, 2013 (JP) .................. 2013-234820

(51) Int. Cl.
*F16H 3/08* (2006.01)
*F16H 63/32* (2006.01)
(Continued)

(52) U.S. Cl.
CPC .............. *F16H 63/32* (2013.01); *F01M 1/02* (2013.01); *F02B 61/02* (2013.01);
(Continued)

(58) Field of Classification Search
CPC ......... F16H 2057/0203; F16H 57/0434; F16H 57/0441; F16H 2057/02065; F16H 2057/02086; F02B 61/02; F02B 67/04
See application file for complete search history.

(56) References Cited

U.S. PATENT DOCUMENTS 7,198,021 B2 4/2007 Kawakubo et al.
7,694,657 B2 4/2010 Gunji et al.
(Continued)

FOREIGN PATENT DOCUMENTS

CN 1605720 4/2005
CN 101396964 4/2009
(Continued)

OTHER PUBLICATIONS

European Application No. 14190716.2 Extended European Search Report dated May 8, 2015, 6 pages.
(Continued)

*Primary Examiner* — William Kelleher
*Assistant Examiner* — Jake Cook

(57) ABSTRACT

A gear changer of a power transmitting device includes an input shaft to which a rotational force is inputted from an engine, an output shaft for outputting the rotational force to a rear wheel, and a plurality of speed change gear pairs for transmitting the rotational force from the input shaft to the output shaft. A slider member for selecting one of the speed change gear pairs to transmit the rotational force from the input shaft to the output shaft is supported by the output shaft. Selection of one of the speed change gear pairs is accomplished by moving the slider member in an axial direction by means of a shifter mechanism. A pump rotary shaft, to which the rotation is transmitted from the input shaft, is disposed at a location between the input shaft and the shifter mechanism in a circumferential direction of the output shaft.

20 Claims, 4 Drawing Sheets

(51) Int. Cl.
*F02B 61/02* (2006.01)
*F01M 1/02* (2006.01)
*F16H 57/04* (2010.01)
*F16H 57/02* (2012.01)

(52) U.S. Cl.
CPC .. *F16H 57/0434* (2013.01); *F16H 2057/0203* (2013.01); *Y10T 74/20183* (2015.01)

(56) References Cited

U.S. PATENT DOCUMENTS

| | | | |
|---|---|---|---|
| 7,891,262 B2 | 2/2011 | Hayakawa et al. | |
| 8,235,160 B2 * | 8/2012 | Ogasawara | F16H 61/32 |
| | | | 180/230 |
| 2005/0085329 A1 | 4/2005 | Kawakubo et al. | |
| 2006/0157004 A1 | 7/2006 | Gunji et al. | |
| 2009/0084208 A1 | 4/2009 | Hayakawa et al. | |

FOREIGN PATENT DOCUMENTS

| | | |
|---|---|---|
| JP | 2003-148612 | 5/2003 |
| JP | 2006-200367 | 8/2006 |
| JP | 2007-315434 | 12/2007 |
| JP | 2010-054056 | 3/2010 |
| JP | 2011-196432 | 10/2011 |
| JP | 2012-127476 | 7/2012 |

OTHER PUBLICATIONS

Office Action in Chinese Patent Application No. 201416045685.5 dated May 5, 2016 (7 pages).
Notification of Reason(s) for Rejection Issued Feb. 28, 2017 for Corresponding Japan Patent Application No. 2013-234820 with English Language Summary (5 pages).

* cited by examiner

POWER TRANSMITTING DEVICE

CROSS REFERENCE TO THE RELATED APPLICATION

This application is based on and claims Convention priority to Japanese patent application No. 2013-234820, filed Nov. 13, 2013, the entire disclosure of which is herein incorporated by reference as a part of this application.

BACKGROUND OF THE INVENTION

Field of the Invention

The present invention relates to a power transmission device for transmitting a rotation from a drive source to a driven unit.

Description of Related Art

The power transmitting device employed in automotive vehicles such as, for example, motorcycle to transmit a rotational output from the engine to drive wheels includes a transmission to vary the gear ratio therebetween. See, for example, the JP Laid-open Patent Publication No. 2012-127476. The transmission generally includes an input shaft drivingly coupled with a drive source, that is, engine, an output shaft drivingly coupled with a to-be-driven unit such as the driving wheels, and a gear changer for adjusting the number of revolutions of the output shaft relative to the input shaft to provide the driving wheel. The power transmitting device may extract the driving force from the input shaft of the gear changer to drive a separate member.

SUMMARY OF THE INVENTION

It has, however, been found that because of the output shaft and the gear changer both disposed in the vicinity of the input shaft, difficulty has been found to install adjacent the input shaft, the separate member that is to be driven by the input shaft. For this reason, the gear changer disposed between the input shaft and the separate member, if so successfully implemented, tends to become complicated, accompanied by the increase in size of the power transmitting device inclusive of the separate member.

In view of the foregoing, the present invention has been devised to substantially eliminate the foregoing problems and inconveniences and has for its essential object to provide a power transmitting device simple in structure enough to allow it to be compactized.

In order to accomplish the foregoing object, the present invention provides a power transmitting device which includes an input shaft to which a rotational force of a drive source is inputted, an output shaft to output the rotational force to a to-be-driven unit, a plurality of speed change gear pairs to transmit the rotational force from the input shaft to the output shaft, a slider member supported by the output shaft to transmit the rotational force from the input shaft to the output shaft upon an axial movement, a shifter mechanism to move the slider member in an axial direction, and a non-speed change shaft to which the rotational force is transmitted from the input shaft. The non-speed change shaft referred to above is disposed between the input shaft and the shifter mechanism in a circumferential direction of the output shaft.

It is to be noted that the wording "between the input shaft and the shifter mechanism in a circumferential direction of the output shaft" referred to above and hereinafter should be understood as meaning a sector shaped region, of which the sector shape is defined by a first straight line, connecting between the output shaft and the input shaft, and a second straight line, connecting between the output shaft and the shifter mechanism, and has a center angle not greater than 180°.

The non-speed change shaft and the output shaft are those to which a drive power is transmitted from the input shaft, and are disposed around the input shaft. According to this construction, since the slider member is supported by the output shaft, there is no need for the shifter mechanism to be positioned close to the input shaft. For this reason, the input shaft and the shifter mechanism can be disposed separated a distance from each other, and therefore, a non-speed changer can be disposed between the input shaft and the shifter mechanism. In other words, by a distance over which the input shaft and the shifter mechanism are separated away from each other, the non-speed change shaft can be brought to a position close to the input shaft. As a result, a transmitting member between the non-speed change shaft and the input shaft can be reduced in size.

In a preferred embodiment of the present invention, the plurality of the speed change gear pair may include a plurality of input side speed change gears supported axially immovably and mutually non-rotatably relative to the input shaft, and a plurality of output side speed change gears meshed with the input side speed change gears. The output side speed change gears is supported axially immovably and rotatably relative to the output shaft. In this case, the slider member is selectively engageable relative to the plurality of output side speed change gears and is supported axially movably, but non-rotatably relative to the output shaft. According to this structural feature, the slider member can be suitably disposed only on the output shaft. Also, since the speed change gear is immovable in an axial direction, an undesirable fall of the gear can be effectively avoided in comparison with the case where the gear itself is movable, to thereby avoid any pitching.

In another preferred embodiment of the present invention, a transmitting member may be employed to transmit the rotational force from the input shaft to the non-speed change shaft, in which case the shifter mechanism referred to above is disposed spaced a distance in a circumferential direction relative to the transmitting member. According to this structural feature, since the shifter mechanism and the transmitting member do not overlap when viewed in an axial direction, access can be made to the shifter mechanism with no transmitting member removed. As a result, the maintenance of the shifter mechanism improves.

In a further preferred embodiment of the present invention, particularly where the power transmitting device is disposed inside the crankcase for the engine, the non-speed change shaft referred to above is preferably employed in the form of a rotary shaft of a pump used to circulate a liquid lubricant or a liquid coolant for the engine. According to this structural feature, since the shifter mechanism and the input shaft can be disposed separated a distance from each other, a space can be secured adjacent the input shaft and, hence, the capacity of the pump can be increased without increasing the size of the engine.

In a still further preferred embodiment of the present invention, particularly where the power transmitting device is mounted on the motorcycle, the input shaft, the output shaft and the rotary shaft of the pump preferably extend in a direction parallel to a motorcycle widthwise direction and the rotary shaft of the pump is disposed at a location above a lower end of the shifter mechanism. According to this arrangement, since the pump is disposed above, the bank angle of the motorcycle can be secured with the dimension of a lower portion of the engine in a motorcycle widthwise direction being reduced.

In a yet further preferred embodiment of the present invention, particularly where the power transmitting device is mounted on the motorcycle, the shifter mechanism is preferably disposed at a location radially outwardly of an outer peripheral edge of a clutch that is to be mounted on the input shaft. According to this arrangement, access can be made to the shifter mechanism with no need to remove the clutch and, hence, the maintenance of the shifter mechanism improves.

In a yet further preferred embodiment of the present invention, particularly where the shifter mechanism is disposed at the location radially outwardly of the clutch, an interface between a clutch covering, which covers the clutch from a lateral outer side, and the crankcase is preferably outwardly upwardly inclined. This structural feature makes it possible to allow the lower portion of the clutch covering to be disposed inwardly of the widthwise dimension, and therefore, the bank angle of the motorcycle can be secured with the dimension of the engine lower portion in the motorcycle widthwise direction being reduced.

In a yet further preferred embodiment of the present invention, particularly where the power transmitting device is preferably mounted on the motorcycle, the shifter mechanism is disposed at a location rearwardly of the rotary shaft of the pump and a speed changing operation is transmitted from a change operating unit, formed in a rider's footstep, to the shifter mechanism. According to this structural feature, the distance between the change operating unit and the shifter mechanism becomes small and, therefore a transmission path is simplified.

In a yet further preferred embodiment of the present invention, particularly where the power transmitting device is mounted on the motorcycle, an outer end of the pump is preferably positioned at a location inwardly of the motorcycle widthwise direction and remote from an outer end of a generator covering mounted on a rotary shaft of the engine. According to this structural feature, the pump is protected by the generator covering.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, a preferred embodiment of the present invention will be described in detail with particular reference to the accompanying drawings. It is to be noted that the terms "left" and "right" are used to denote opposite positions or directions, respectively, relative to a motorcycle rider or motorist then occupying a motorcycle rider's seat and looking forwards in a direction parallel to the longitudinal sense of the motorcycle.

Figure 1:
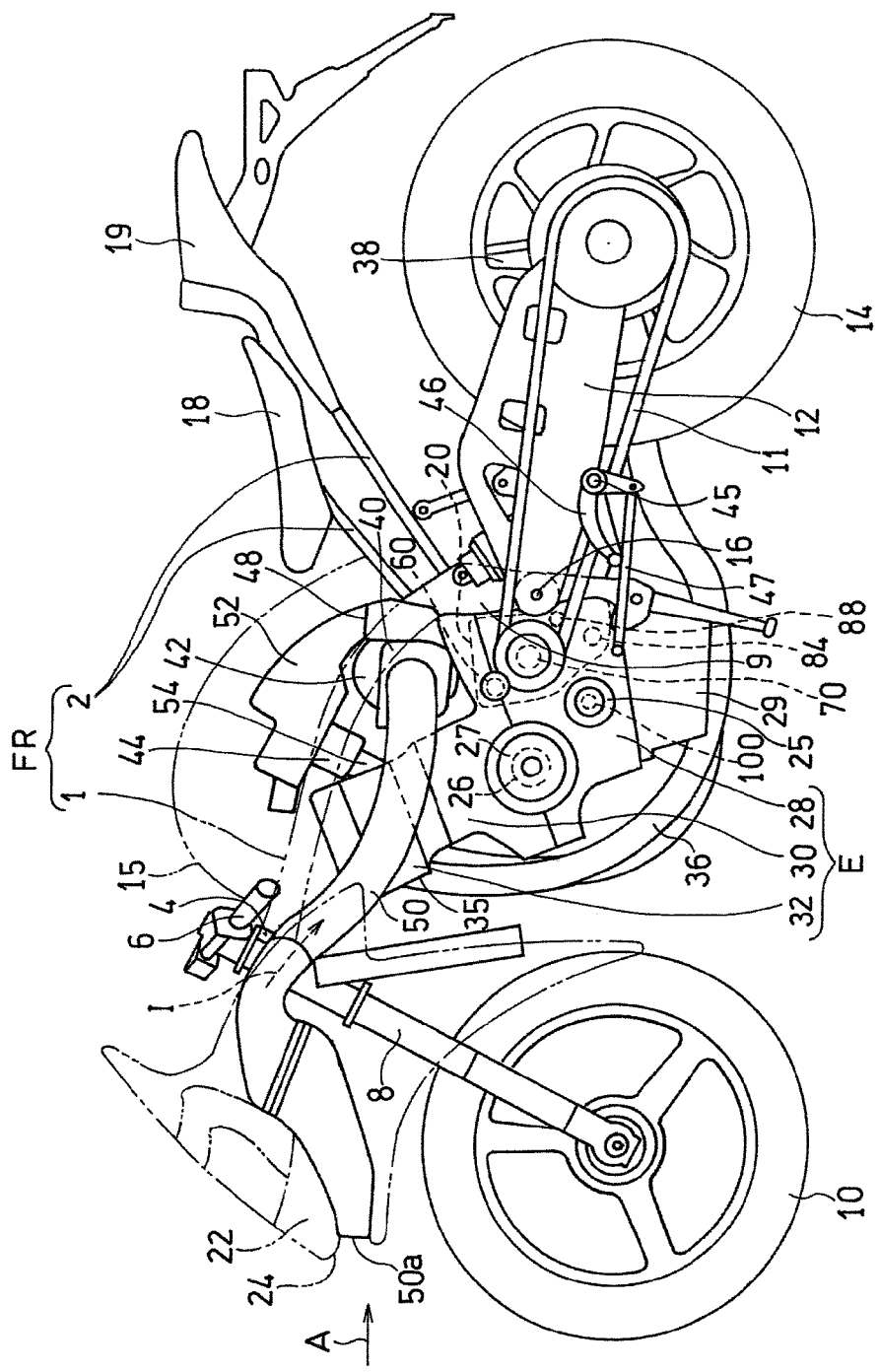
FIG. 1 is a side view showing a motorcycle equipped with a combustion engine including a power transmitting device designed in accordance with a preferred embodiment of the present invention.

FIG. 1 is a side view showing a motorcycle equipped with a power transmitting device designed in accordance with a preferred embodiment of the present invention. This motorcycle includes a motorcycle frame structure FR generally including a main frame 1, forming a front frame assembly, and a seat rail 2 forming a rear frame assembly and fitted to a rear portion of the main frame 1. The main frame 1 has a front end provided with a head pipe 4, and a front fork 8 is rotatably supported by the head pipe 4 through a steering shaft (not shown). The front fork 8 has a front end portion, by which a front wheel 10 is rotatably supported, and also has an upper end portion to which a steering handlebar 6 is secured.

On the other hand, a swingarm bracket 9 is provided at the rear end portion of the main frame 1, which is a lower intermediate portion of the motorcycle frame structure FR. The swingarm bracket 9 is also provided with a pivot pin 16 with which a swingarm 12 is engaged for movement up and down about such pivot pin 16. The swingarm 12 so supported has a rear portion on which a rear wheel 14 is rotatably supported. A motorcycle combustion engine E, which is a motorcycle drive source, is mounted on a lower intermediate portion of the motorcycle frame structure FR and positioned at a location forwardly of the swingarm bracket 9. The rear wheel 14 referred to above, which is a driven unit, is driven by the combustion engine E by means of a substantially endless drive chain 11 in any known manner. The combustion engine E in the present embodiment is employed in the form of, for example, a four cylinders, four cycle parallel multicylinder engine of a water cooled type, although the present invention is not necessarily limited to the use of such particular combustion engine.

The combustion engine E includes a crankshaft 26 having a rotary shaft extending in a leftward and rightward direction (direction parallel to the widthwise direction of the motorcycle), a crankcase 28 supporting the crankshaft 26, an oil pan 29 positioned below the crankcase 28, a cylinder block 30 protruding upwardly from an upper surface of the crankcase 28, and a cylinder head 32 positioned above the cylinder block 30. The crankcase 28 has a rear portion concurrently serving as a transmission casing for accommodating a gear changer 20. In other words, the gear changer 20 is disposed inside the crankcase 28. The crankshaft 26 has a left end portion provided with an electric generator 23

(best shown in FIG. 2) and a generator covering 27 is fitted to a left end face of the crankcase 28 for covering the electric generator 23.

A circulating pump 25 for circulating a liquid coolant and a lubricant through the combustion engine E is disposed at a location diagonally rearwardly downwardly of the generator covering 27 at the left end face of the crankcase 28. In other words, in the embodiment now under discussion, a coolant pump and a lubricant pump are juxtaposed in coaxial relation to each other. More specifically, a single pump rotary shaft 100 is formed with respective impellers for the liquid coolant and the lubricant.

The lubricant is a lubricating oil circulating in a circulating path including the oil pan 29 and members to be lubricated. When this lubricant is supplied to the members to be lubricated such as, for example, bearing portions and piston portions, it is used for the lubrication and cooling of the combustion engine. The liquid coolant is a cooling water that circulates in a circulating path including a radiator, an oil cooler and a water jacket defined within the engine cylinder and is used to remove heat from the combustion engine. The details of the pump 25 will be discussed later.

The cylinder head 32 has four exhaust ports 35 defined in a front surface thereof, and four exhaust pipes 36 are fluid connected with the respective exhaust ports 35. Those four exhaust pipes 36 are merged together at a location beneath the combustion engine E and are in turn fluid connected with an exhaust muffler 38 disposed on a right side of the rear wheel 14.

A fuel tank 15 is disposed in an upper portion of the main frame 1, and the seat rail 2 referred to previously has a motorcyclist's seat 18 and a fellow passenger's seat 19 both supported thereon. Also, a fairing 22 made of a resinous material is fitted to a front portion of the motorcycle frame structure FR. This fairing 22 covers an area forwardly of the head pipe 4 to respective areas laterally frontwardly of the combustion engine E. This fairing 22 has an air intake opening 24 defined therein. This air intake opening 24 is positioned at a front end of the fairing 22 and introduces therethrough air from the outside towards the combustion engine E.

An air intake duct 50 is disposed on a left side of the motorcycle frame structure FR. This air intake duct 50 is supported by the head pipe 4 with its front end opening 50a aligned with the air intake opening 24 in the fairing 22. Air introduced through the front end opening 50a of the air intake duct 50 is boosted by the well known ramming effect.

An air cleaner 40 for substantially purifying the air and a supercharger 42 are disposed on an upper surface of the crankcase 28 at a location rearwardly of the cylinder block 30 and are juxtaposed in a motorcycle widthwise direction with the air cleaner positioned outside. The air intake duct 50 referred to previously extends on the outer left side of the cylinder block 30 and the cylinder head 32 in a front-back direction and introduces the incoming air A from an area forwardly of the combustion engine E towards the air cleaner 40 as an intake air I. The supercharger 42 pressurizes the air, which has been substantially purified by the air cleaner 40 during the flow of air therethrough, before the air is supplied to the combustion engine E.

An air intake chamber 52 is disposed at a location substantially or generally intermediate between the supercharger 42 and an air intake port 54 of the combustion engine E, and this air intake chamber 52 is directly fluid connected with a discharge port 48 of the supercharger 42. The air intake chamber 52 reserves therein a quantity of high pressure intake air I supplied from the supercharger 42 through the discharge port 48. A throttle body 44 is interposed between the air intake chamber 52 and the intake port 54.

The air intake chamber 52 is disposed above the supercharger 42 and the throttle body 44. The fuel tank 15 referred to previously is disposed above the air intake chamber 52 and the throttle body 44.

Rider's footsteps 45 are provided rearwardly of the combustion engine E and a change pedal 46 (change operating unit) is connected with one of the footsteps 45. When the motorcycle rider pushes down on the change pedal 46, a pressing force so applied to the change pedal 46 is transmitted from the change pedal 46 to a shifter mechanism 82, as will be detailed later, through a rod 47 to accomplish a gear shifting operation.

Figure 2:
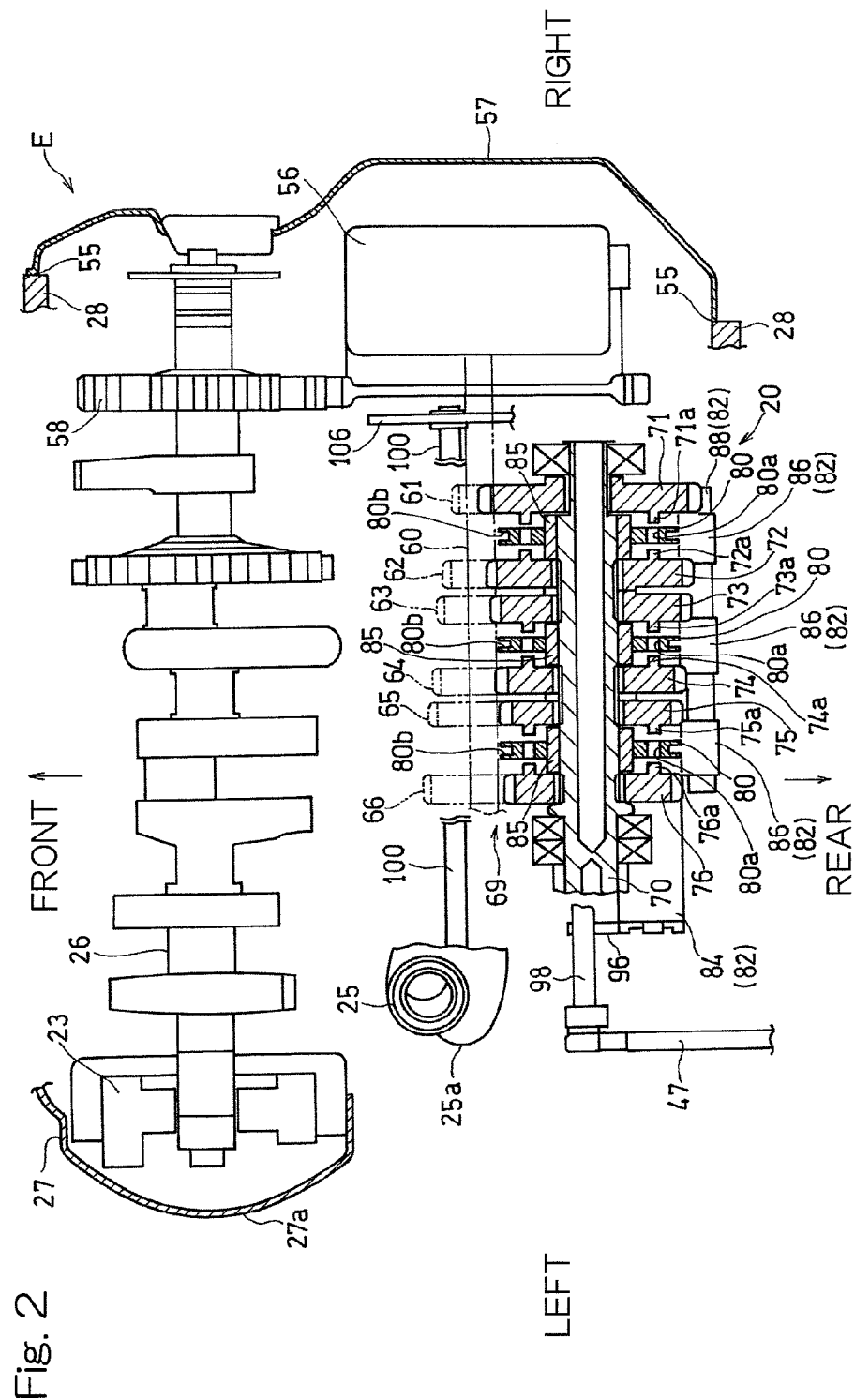
FIG. 2 is a diagram showing, with a portion shown in section, the arrangement of shafts of the power transmitting device.

As shown in FIG. 2, the gear changer 20 includes an input shaft 60, to which a rotational force of the crankshaft 26 of the combustion engine E is inputted, and an output shaft 70 for outputting the rotational force from the input shaft 60 to the rear wheel 14 (shown in FIG. 1). The rotation of the crankshaft 26 is inputted into the input shaft 60 via a clutch 56.

Figure 5:
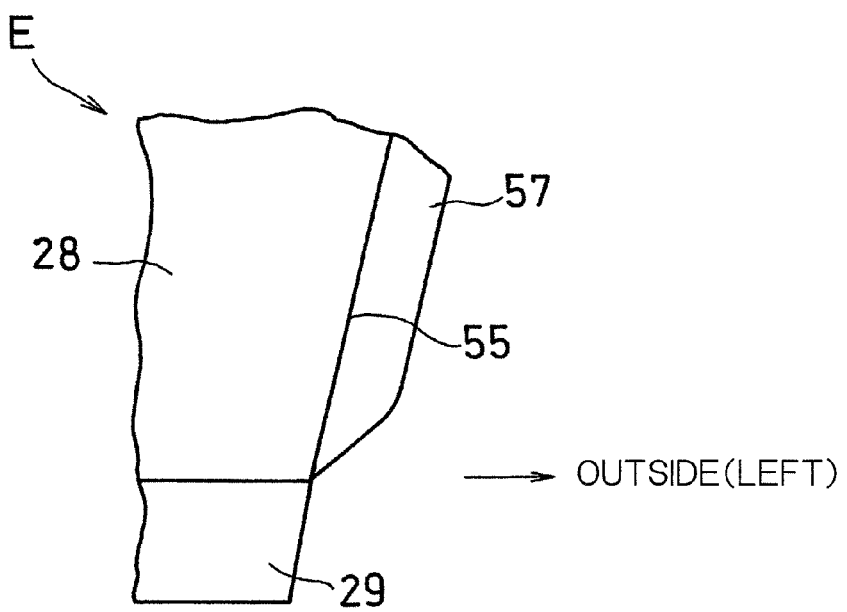
FIG. 5 is a fragmentary front elevational view showing a portion of the motorcycle combustion engine.

The clutch 56 is drivingly connected with a clutch gear 58 mounted on the crankshaft 26. An outer side area of the clutch 56 is covered by a clutch covering 57 fitted to the crankcase 28 referred to previously. As shown in FIG. 5, a mating interface 55 between the clutch covering 57 and the crankcase 28 is inclined diagonally outwardly and upwardly.

As shown in FIG. 2, six input side speed change gears 61 to 66 are mounted on the input shaft 60 in an axially immovable, but mutually non-rotatable fashion. On the other hand, six output side speed change gears 71 to 76 are mounted on the output shaft 70 in an axially immovable, but mutually rotatable fashion. The output side speed change gears 71 to 76 are respectively meshed with the input side speed change gears 61 to 66. It is, however, to be noted that the number of the speed change gears may not be necessarily limited to that shown and described. Those input side speed change gears 61 to 66 and the associated output side speed change gears 71 and 76 cooperate with each other to define corresponding speed change gear pairs 69 each operable to transmit the rotational force from the input shaft 60 to the output shaft 70.

An annular slider member 80 is supported on an outer periphery of the output shaft 70 and is operable to select the speed change gear pair 69 (one of the speed change gear pairs 69) for transmitting the rotational force from the input shaft 60 to the output shaft 70 through a ring 85. This slider member 80 is axially movably, but mutually non-rotatably supported on the output shaft 70. The slider member 80 is provided three in number: one positioned between the output side first speed gear 71 and the output side second speed gear 72, another positioned between the output side third speed gear 73 and the output side fourth speed gear 74, and the rest positioned between the output side fifth speed gear 75 and the output side sixth speed gear 76.

Each of the output side speed change gears 71 to 76 includes a dog pawl 71a to 76a in the form of an engagement projection extending towards the adjacent slider member 80, and a dog hole 80a in the form of an axially extending throughhole is formed in each of the slider members 80. The dog pawls 71a to 76a and the respective dog holes 80a are employed a plural number, for example, five, having been spaced a distance from each other in a circumferential direction. Also, each of the slider member 80 has its outer peripheral surface formed with a to-be-engaged portion 80b in the form of an annular groove.

The gear changer 20 also includes a shifter mechanism 82 for axially moving the slider member 80. This shifter mechanism 82 includes a change drum 84, to which the pressing force (gear shifting operation) applied to the change pedal 46 is inputted through the rod 47, a shift fork 86 movably guided by a guide groove (not shown) defined in an outer peripheral surface of the change drum 84 to move the slider member 80 in an axial direction, and a shift rod 88 in which the shift fork 86 is axially movably built. The shift fork 86 is provided three in number, one for each of the slider member 80.

Figure 3:
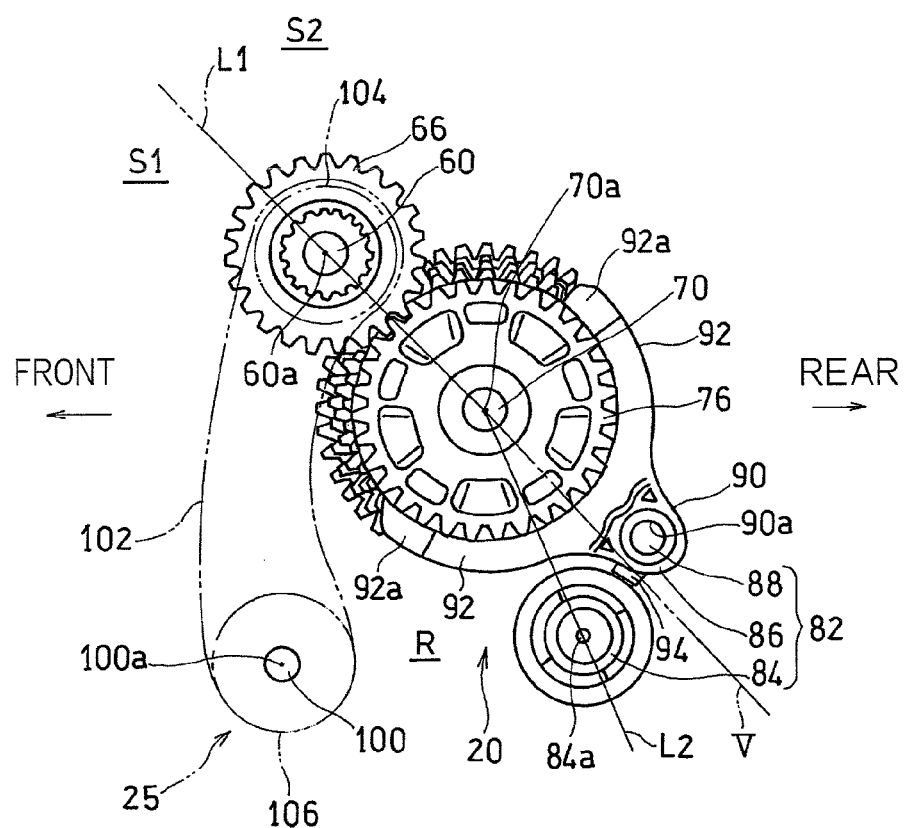
FIG. 3 is a side view showing the arrangement of the shafts of the power transmitting device.

FIG. 3 is a diagram showing the gear changer 20 as viewed from a left side. As shown in FIG. 3, each of the shift forks 86 has a base portion 90, which is supported by the shift rod 88, and two arcuate arms 92 and 92 branched from the base portion 90 so as to extend along the outer periphery of the slider member 80. A free end of each of the arcuate arms 92 and 92 opposite to the base portion 90 thereof is formed with an engagement 92a engageable in the to-be-engaged 80b (best shown in FIG. 2) in each of the slider member 80.

The base portion 90 of the shift fork 86 is formed with an axially oriented throughhole 90a and, with the shift rod 88 inserted into this throughhole 90a, the shift fork 86 is axially movably supported by the shift rod 88. The base portion 90 of the shift fork 86 also includes a pin 94 extending slantwise forwardly towards the change drum 84. This pin 94 is engaged in the guide groove (not shown) defined in the outer periphery of the change drum 84.

The change drum 84 has a motorcycle widthwise outer end with which the rod 47 referred to previously is connected through a lever 96 and a gear shift shaft 98 as shown in FIG. 2. In other words, when the change pedal 46, best shown in FIG. 1, is pushed down, the pressing force is transmitted from the change pedal 46 to the change drum 84, shown in FIG. 2, through the rod 47, then through the gear shift shaft 98 and finally through the lever 96, resulting in the rotation of the change drum 84.

When the change drum 84 is so rotated in the manner described above, the shift fork 86 moves on the shift rod 88 in a leftward and rightward direction (axial direction) in dependence on the rotation of the change drum 84. Once the shift fork 86 moves in the manner described above, the engagement 92a of the selected shift fork 86 (best shown in FIG. 3) is brought into engagement with the to-be-engaged portion 80b of the slider member 80, thus causing the slider member 80 to move in the axial direction relative to the output shaft 70.

The axial movement of the slider member 80 referred to above causes the dog hole 80a in the selected slider member 80 to be engaged with the dog pawl 71a to 76a in the corresponding output side speed change gear 71 to 76. In this way, the arbitrary output side speed change gear 71 to 76 can be selected and, through the selected output side speed change gear 71 to 76, the rotational force of the crankshaft 26 is transmitted to the output shaft 70.

Figure 4:
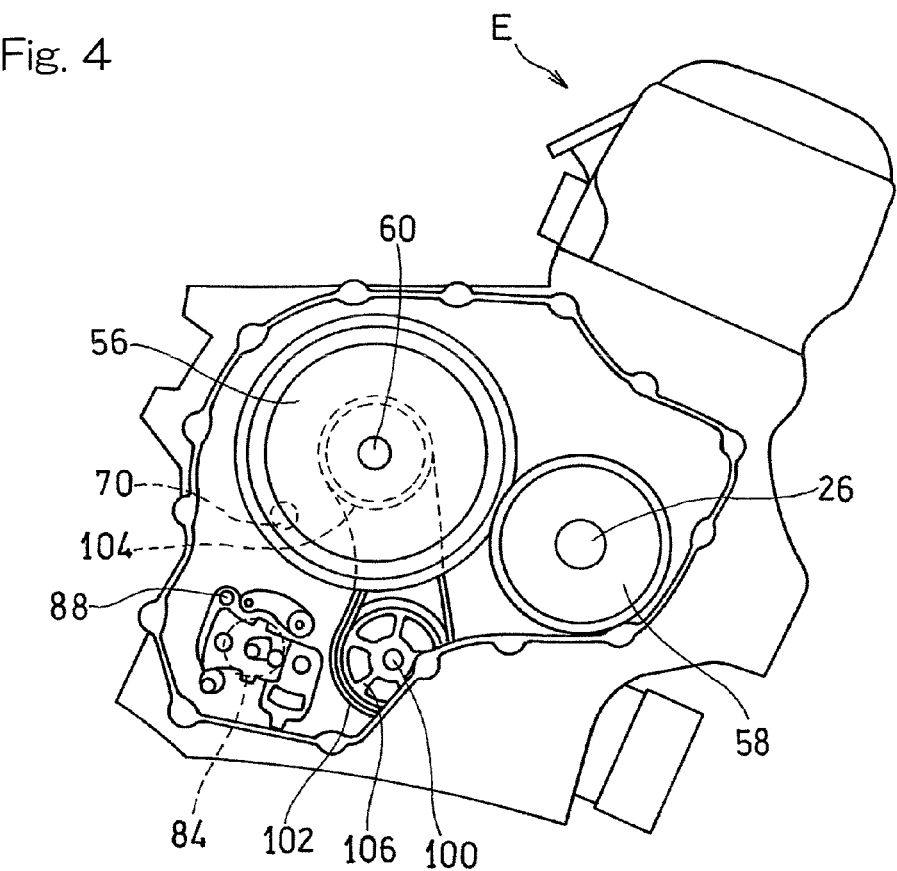
FIG. 4 is a side view showing the motorcycle combustion engine as viewed in a direction opposite to that shown in FIG. 3.

FIG. 4 is a side view of the combustion engine E as viewed from a right side. FIG. 4 shows a condition in which the clutch covering 57 is removed. As shown in FIG. 4, the rotation of the input shaft 60 is transmitted to a pump rotary shaft 100 of the pump 25 referred to previously (best shown in FIG. 1). Specifically, pulleys 104 and 106 are fixed to respective right side end portions of the input shaft 60 and the pump rotary shaft 100, and the rotation of the input shaft 60 is transmitted to the pump rotary shaft 100 by means of a substantially endless chain 102, which is a transmitting member trained between the pulleys 104 and 106.

The pump rotary shaft 100 is applied a motive energy from the input shaft 60 of the gear changer 20, but does not participate in the gear shifting operation. Also, this pump rotary shaft 100 is connected with the input shaft 60 through a single transmitting path 102 in a fashion unable to execute the speed change and, hence, the rotation from the input shaft 60 cannot be changed in speed. In other words, the pump rotary shaft 100 is a non-speed changing shaft.

As shown in FIG. 1, the pump 25 is disposed at a location forwardly of the change drum 84 and below the output shaft 70 of the gear changer 20. An outer end 25a of the pump 25 best shown in FIG. 2 is positioned inwardly of an outer end 27a of the generator covering 27 with respect to the motorcycle widthwise direction, As shown in FIG. 3, the pump rotary shaft 100 is disposed at a location intermediate between the input shaft 60 and a rotary shaft 84a of the change drum 84 in an outer peripheral direction of the output shaft 70. It should be noted that the wording "between the input shaft 60 and a rotary shaft 84a of the change drum 84 in an outer peripheral direction of the output shaft 70" should be understood as meaning a sector shaped region R, of which the sector shape is defined by a first straight line L1, connecting between the output shaft 70 and the input shaft 60, and a second straight line L2, connecting between the output shaft 70 and the rotary shaft 84a of the change drum 80, and has a center angle not greater than 180°.

In other words, the pump rotary shaft 100 and the rotary shaft 84 of the change drum 84 are disposed at a region S1 on the same side in two regions S1 and S2 with the boundary between those two regions S1 and S2 represented by the imaginary plane V that is drawn to pass across the input shaft 60 and the output shaft 70. In the embodiment now under discussion, in the region S1 on a lower side with respect to the imaginary plane V, the pump rotary shaft 100 and the change drum 84 are disposed. Accordingly, it is possible to avoid the upward protrusion of the transmission casing and also to facilitate the disposition of the supercharger 42 on an upper surface of the transmission casing.

Since, as described hereinabove, the pump rotary shaft 100 and the rotary shaft 84a of the change drum 84 are disposed having been displaced in a direction circumferentially of the output shaft 70, the pump 25 can be increased in size in a radial direction and also in the axial direction, and also it is easy to dispose an impeller (not shown) of the pump 25 inside of the crankcase 28. Also, with the interference between the pump 25 and the change drum 84 being avoided, the pump can be increased in side with no need to increase the size of the combustion engine E.

The rotary shaft 84a of the change drum 84 is disposed at a location rearwardly of an axis 70a of the output shaft 70. The change drum 84 is at a location rearwardly of the pump rotary shaft 100, and the rotary shaft 84a of the change drum 84 and the pump rotary shaft 100 are juxtaposed relative to each other so as to extend substantially horizontally. It is, however, to be noted that the pump rotary shaft 100 may be disposed at a location upwardly of a lower end of the change drum 84. As described above, when the pump 25 is disposed at a high location, the dimension of a lower portion of the combustion engine in the motorcycle widthwise direction becomes small and, therefore, the bank angle of the motorcycle can be secured.

The output shaft 70 is disposed at a location downwardly and rearwardly of the input shaft 60, and the pump rotary shaft 100 is disposed at a location forwardly of the output shaft 70. Accordingly, while avoiding the interference with the output shaft 70, the pump rotary shaft 100 can be easily disposed upwardly. Also, the distance from an axis 60*a* of the input shaft 60 to an axis 100*a* of the pump rotary shaft 100 is smaller than the distance from the axis 60*a* of the input shaft 60 to the rotary shaft 84*a* of the change drum 84. Further, the distance from the axis 70*a* of the output shaft 70 to the rotary shaft 84*a* of the change drum 84 is smaller than the distance from the axis 70*a* of the output shaft 70 to the axis 100*a* of the pump rotary shaft 100.

In other words, the rotary shaft 84*a* of the change drum 84 is disposed at a location closer to the output shaft 70 than to the pump rotary shaft 100, and the rotary shaft 84*a* of the change drum 84 is disposed substantially on one side remote from the input shaft 60 with respect to the output shaft 70.

As shown in FIG. 4, the change drum 84 and the shift rod 88 are disposed having been separated a distance in a circumferential direction of the output shaft 70 relative to the chain 102 referred to previously. In other words, the change drum 84 and the shift rod 88 are not overlapped when viewed in the axial direction. Also, the change drum 84 and the shift rod 88 are disposed radially outwardly of an outer peripheral edge of the clutch 56 which is mounted on the input shaft 60. In other words, the change drum 84 and the shift rod 88 do not overlap the clutch 56 when viewed in the axial direction, In the construction hereinabove described, the rotary shaft 100 and the output shaft 70, both shown in FIG. 3, are those to which the driving power is transmitted from the input shaft 60 and are disposed around the input shaft 60. Since the slider member 80 best shown in FIG. 2 is supported solely by the output shaft 70, there is no need to position the shifter mechanism 82 in the close vicinity of the input shaft 60. For this reason, the input shaft 60 and the shifter mechanism 82 can be disposed separated a distance from each other, and the pump 25 is disposed at a location between the input shaft 60 and the shifter mechanism 82. As a result thereof, the transmitting member 102 disposed between the pump rotary shaft 100 and the input shaft 60 can be made small in size.

As discussed above, since the shifter mechanism 82 and the input shaft 60 can be disposed separated a distance from each other, a space can be secured in the vicinity of the input shaft 60 and, therefore, with no need to increase the size of the combustion engine E, the capacity of the pump 25 can be increased. The pump 25 can be increased in size not only in a radial direction thereof, but also in a direction axially inwardly thereof. With the pump 25 so increased in size in the direction axially inwardly, it is possible to avoid protrusion of the pump 25 from an outer surface of the combustion engine in a direction outwardly thereof, even though the pump 25 is increased in size, and, therefore, the bank angle can be secured. In addition, even when impellers of two pumps, one for the lubricant and the other for the coolant, are axially juxtaposed, the amount of protrusion of the pump 25 from the engine outer surface can be suppressed.

Since the output side speed change gears 71 to 76, all best shown in FIG. 2, are mounted axially immovable as hereinbefore described, even though the gear shifting operation is carried out, no fall or inclination occurs in the gears themselves. Accordingly, the favorable toothed engagement of those gears can be maintained and the pitching can therefore be avoided. Also, since each of the output side speed change gears 71 to 76 is axially fixed, the axial length of each of those shafts can be kept small. Thus, the shaft can be reduced in weight with its diameter reduced and, also, fluctuation of the shaft under the influence of a load during the operation can be suppressed to enable a shift touch to be smooth. In addition, since the slider member 80 is provided only on the output shaft 70, the shift rod 88 can be brought together into one. Yet, when the output side speed change gears 71 to 76 are formed with the dog pawls 71*a* to 76*a*, respectively, the output side speed change gears 71 to 76 can have an increased strength as compared with the use of an engagement recess.

Since, as shown in FIG. 4, the change drum 84, the shift rod 88 and the chain 102 do not overlap when viewed in the axial direction, access can be made to the change drum 84 and the shift rod 88 with no need to remove the chain 102. As a result thereof, the maintenance of the shifter mechanism 82 is facilitated.

Since the change drum 84 and the shift rod 88 are disposed radially outwardly of the outer peripheral edge of the clutch 56, with no need to remove the clutch 56 access can be made to the change drum 84 and the shift rod 88 and, therefore, the maintenance of the shifter mechanism 82 is facilitated.

Since as shown in FIG. 5, the mating interface 55 between the clutch covering 57 and the crankcase 28 is outwardly upwardly inclined, a lower portion of the clutch covering 57 can be disposed inwardly of the motorcycle widthwise direction. Accordingly, the dimension of the engine lower portion in the motorcycle widthwise direction is reduced to allow the bank angle of the motorcycle to be secured.

Since as shown in FIG. 1, the change drum 84 is disposed rearwardly of the pump rotary shaft 100, the distance between the change pedal 46 and the change drum 84 becomes small. Accordingly, the rod 47, which is a transmitting path between the change pedal 46 and the change drum 84, comes to have a reduced length.

Since the outer end 25*a* of the pump 25 shown in FIG. 2 is positioned inwardly of the outer end 27*a* of the generator covering 27 with respect to the motorcycle widthwise direction, the pump 25 is protected by the generator covering 27.

The power transmitting device of the present invention is suitably applied to a high output, high rotation engine that requires a high pumping capacity. More specifically, it is suitably used in the engine equipped with the supercharger. Also, it is suitably used in the engine of a type in which the lubricant and coolant oil are circulated through the supercharger, the piston and the gear train.

In the practice of the foregoing embodiment, the pump 25 can be increased in size and, therefore, the pressure under which the lubricant oil and the coolant water are supplied can be increased. Accordingly, the lubricating and cooling performances can be increased or stabilized. For example, by means of the lubrication of the supercharger, the lubrication of the power transmitting mechanism from the engine to the supercharger, the jetting of the lubricant oil to tooth faces of the speed changing gear and the spraying of the lubricant oil onto a bottom face of the piston and other factors, the combustion engine employed in the practice of the foregoing embodiment is desired to have an increased supply pressure of the lubricant oil as compared with that in a low output engine. Similarly, an increase of the amount of circulation of the cooling water to an oil cooler, a water jacket and others is desired for in order to accommodate the temperature raise resulting from the increase of the output of the combustion engine. Also, where the intercooler is employed to cool the intake air, a further increase of the amount of circulation of the cooling water is also desired for. The power transmitting device of the present invention as hereinbefore fully described is particularly suitably employed with such a high output engine.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, reference has been made to the use of the change drum as a gear shifting mechanism, the present invention need not be necessary limited to the use thereof, but a motor may be employed. Also, it is possible to change the gear ratio by the use of an actuator and regardless of a rider's manipulation.

Furthermore, although in describing the foregoing embodiment, reference has been made to the example in which a non-speed change shaft is a pump rotary shaft, any device other than the pump may be used.

In describing the foregoing embodiment, the slider members 80 have been shown and described as the members separate from the output side speed change gears 71 to 76, the output side speed change gear themselves may be rendered to be the slider members. The output side speed change gears 71 to 76 may be provided with engagement recesses in place of the dog pawls 71a to 76a, to reduce the weight thereof. Also, the drive source is not necessarily limited to the engine, but an electric motor, for example, may be used for the drive source.

Although the power transmitting device of the present invention is suitably employed in the motorcycle, it may be employed in, for example, the engine for any vehicle other than the motorcycle and marine vessels and also to a ground installed engine. Yet, the power transmitting device of the present invention can be applied to the engine having no supercharger and to an air-cooled engine. In such case, the pump is used solely for lubrication purpose.

Accordingly, such changes and modifications are, unless they depart from the scope of the present invention as delivered from the claims annexed hereto, to be construed as included therein.

REFERENCE NUMERALS

14 . . . Rear wheel (To-be-driven Unit)
20 . . . Gear changer
25 . . . Pump
28 . . . Crankcase
27 . . . Generator covering
45 . . . Footstep
46 . . . Change pedal (Change operating unit)
55 . . . Interface
56 . . . Clutch
57 . . . Clutch covering
60 . . . Input shaft
61, 62, 63, 64, 65, 66 . . . Input side speed change gear
69 . . . Speed change gear pair
70 . . . Output shaft
71, 72, 73, 74, 75, 76 . . . Output side speed change gear
80 . . . Slider member
82 . . . Shifter mechanism
100 . . . Pump rotary shaft (Non-speed change shaft)
102 . . . Chain (Transmitting member)
E . . . Combustion engine (Drive source)

What is claimed is:

1. A power transmitting device which comprises:
an input shaft to which a rotational force of a drive source is inputted;
an output shaft to output the rotational force to a to-be-driven unit;
a plurality of speed change gear pairs to transmit the rotational force from the input shaft to the output shaft;
a slider member supported only by the output shaft to transmit the rotational force from the input shaft to the output shaft upon an axial movement;
a shifter mechanism to move the slider member in an axial direction; and
a non-speed change shaft to which the rotational force is transmitted from the input shaft, the non-speed change shaft being disposed between the input shaft and the shifter mechanism in a circumferential direction of the output shaft wherein the shifter mechanism includes a rotary shaft disposed at a location closer to the output shaft than to the non-speed change shaft.

2. The power transmitting device as claimed in claim 1, wherein the plurality of the speed change gear pairs comprise:
a plurality of input side speed change gears supported axially immovably and mutually non-rotatably relative to the input shaft; and
a plurality of output side speed change gears meshed with the input side speed change gears, the output side speed change gears being supported axially immovably and rotatably relative to the output shaft, and
wherein the slider member is selectively engageable relative to the plurality of output side speed change gears and is supported axially movably, but non-rotatably relative to the output shaft.

3. The power transmitting device as claimed in claim 1, further comprising a transmitting member to transmit the rotational force from the input shaft to the non-speed change shaft,
wherein the shifter mechanism is disposed spaced a distance in a circumferential direction relative to the transmitting member.

4. The power transmitting device as claimed in claim 1 which is disposed inside a crankcase for an engine, wherein the non-speed change shaft is a rotary shaft of a pump used to circulate a liquid lubricant or a liquid coolant for the engine.

5. The power transmitting device as claimed in claim 4 which is mounted on a motorcycle, wherein:
the input shaft, the output shaft and the rotary shaft of the pump extend in a direction parallel to a motorcycle widthwise direction; and
the rotary shaft of the pump is disposed at a location above a lower end of the shifter mechanism.

6. The power transmitting device as claimed in claim 5, wherein the shifter mechanism is disposed at a location radially outwardly of an outer peripheral edge of a clutch that is mounted on the input shaft.

7. The power transmitting device as claimed in claim 6, further comprising a clutch covering which covers the clutch from a lateral outer side,
wherein an interface between the clutch covering and the crankcase is outwardly upwardly inclined.

8. The power transmitting device as claimed in claim 5, further comprising a rider's footstep and a change operating unit formed in the rider's footstep, wherein:
the shifter mechanism is disposed at a location rearwardly of the rotary shaft of the pump; and
a speed changing operation is transmitted from the change operating unit to the shifter mechanism.

9. The power transmitting device as claimed in claim 5, further comprising a generator covering mounted on a rotary shaft of the engine, wherein an outer end of the pump is positioned at a location inwardly of the motorcycle widthwise direction and remote from an outer end of the generator covering.

10. The power transmitting device as claimed in claim 1, wherein the shifter mechanism includes a rotary shaft disposed substantially on one side remote from the input shaft with respect to the output shaft.

11. A power transmitting device which comprises:
an input shaft to which a rotational force of a drive source is inputted;
an output shaft to output the rotational force to a to-be-driven unit;
a plurality of speed change gear pairs to transmit the rotational force from the input shaft to the output shaft;
a slider member supported only by the output shaft to transmit the rotational force from the input shaft to the output shaft upon an axial movement;
a shifter mechanism to move the slider member in an axial direction; and
a non-speed change shaft to which the rotational force is transmitted from the input shaft, the non-speed change shaft being disposed between the input shaft and the shifter mechanism in a circumferential direction of the output shaft wherein the outport shaft is disposed at a location downwardly and, rearwardly of the input shaft.

12. The power transmitting device as claimed in claim 1, wherein the shifter mechanism includes a rotary shaft disposed at a location rearwardly of the output shaft.

13. The power transmitting device as claimed in claim 11, wherein the plurality of the speed change gear pairs comprise:
a plurality of input side speed change gears supported axially immovably and mutually non-rotatably relative to the input shaft; and
a plurality of output side speed change gears meshed with the input side speed change gears, the output side speed change gears being supported axially immovably and rotatably relative to the output shaft, and
wherein the slider member is selectively engageable relative to the plurality of output side speed change gears and is supported axially movably, but non-rotatably relative to the output shaft.

14. The power transmitting device as claimed in claim 11, further comprising a transmitting member to transmit the rotational force from the input shaft to the non-speed change shaft, wherein the sifter mechanism is disposed spaced a distance in a circumferential direction relative to the transmitting member.

15. The power transmitting device as claimed in claim 11 which is disposed inside a crankcase for an engine, wherein the non-speed change shaft is a rotary shaft of a pump used to circulate a liquid lubricant or a liquid coolant for the engine.

16. The power transmitting device as claimed in claim 15 which is mounted on a motorcycle, wherein the input shaft, the output shaft and the rotary shaft of the pump extend in a direction parallel to a motorcycle widthwise direction; and
the rotary shaft of the pump is disposed at a location above a lower end of the shifter mechanism.

17. The power transmitting device as claimed in claim 16, wherein the shifter mechanism is disposed at a location radially outwardly of an outer peripheral edge of a clutch that is mounted on the input shaft.

18. The power transmitting device as claimed in claim 17, further comprising a clutch covering which covers the clutch from a lateral outer side, wherein an interface between the clutch covering and the crankcase is outwardly upwardly inclined.

19. The power transmitting device as claimed in claim 16, further comprising a rider's footstep and a change operating unit formed in the rider's footstep, wherein:
the shifter mechanism is disposed at a location rearwardly of the rotary shaft the pump; and
a speed changing operation is transmitted from the change operating unit to the shifter mechanism.

20. The power transmitting device as claimed in claim 16, further comprising a generator covering mounted on a rotary shaft of the engine,
wherein an outer end of the pump is positioned at a location inwardly of the motorcycle widthwise direction and remote from an outer end of the generator covering.

* * * * *